(12) United States Patent
Jang (10) Patent No.: US 12,330,249 B2
(45) Date of Patent: Jun. 17, 2025

(54) HARDWARE AUTOMATIC FASTENING APPARATUS

(71) Applicants: HYUNDAI MOTOR COMPANY, Seoul (KR); KIA CORPORATION, Seoul (KR)

(72) Inventor: Ji Eun Jang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 392 days.

(21) Appl. No.: 17/869,149

(22) Filed: Jul. 20, 2022

(65) Prior Publication Data

US 2023/0081846 A1 Mar. 16, 2023

(30) Foreign Application Priority Data

Sep. 16, 2021 (KR) ........................ 10-2021-0124241

(51) Int. Cl.
*B23P 19/00* (2006.01)
*B23P 19/06* (2006.01)

(52) U.S. Cl.
CPC ............. *B23P 19/002* (2013.01); *B23P 19/06* (2013.01)

(58) Field of Classification Search
CPC ....... B23P 19/002; B23P 19/06; B23P 19/006; B23P 19/008; B23P 19/08; B23P 19/082; B23P 19/001; B23P 21/002; B25B 21/00; B25B 21/002; B25B 23/04; B25B 23/06; B25B 23/065; B25B 23/10; B25B 23/12; B25B 11/02

USPC ....... 470/167, 164, 165; 81/57.37, 430, 431, 81/432, 433; 29/240, 809, 810
See application file for complete search history.

(56) References Cited

U.S. PATENT DOCUMENTS

| 4,338,709 A * | 7/1982 | Straub ................ B23Q 3/15706 483/59 |
| 5,672,145 A * | 9/1997 | Pollington ......... B23Q 3/15706 483/65 |
| 7,401,659 B2 * | 7/2008 | Hsu ....................... B25B 23/045 173/4 |

FOREIGN PATENT DOCUMENTS

| KR | 20-0419980 Y1 | 6/2006 |
| KR | 10-1881035 B1 | 7/2018 |
| KR | 2021-0061131 A | 5/2021 |

* cited by examiner

*Primary Examiner* — Robert F Neibaur
(74) *Attorney, Agent, or Firm* — MCDONNELL BOEHNEN HULBERT & BERGHOFF LLP

(57) ABSTRACT

A hardware automatic fastening apparatus includes a magazine having a lever formed on an outer edge to store and supply hardware including any one or more types of a bolt, a nut, and a clip, a rotating part coupled to the magazine to rotate the magazine to position the hardware at a predetermined position, and a torque generating tool provided with an ascending and descending mechanism for ascending the hardware positioned by the rotating part upon ascending, and provided with a torque applying part for applying a torque to the ascended hardware, and the lever has a latch structure.

15 Claims, 6 Drawing Sheets

HARDWARE AUTOMATIC FASTENING APPARATUS

CROSS REFERENCE TO RELATED APPLICATIONS

The present application claims priority of Korean Patent Application No. 10-2021-0124241 filed on Sep. 16, 2021, the entire contents of which is incorporated herein for all purposes by this reference.

BACKGROUND

Field of the Disclosure

The present disclosure relates to a hardware automatic fastening apparatus, and more specifically, to a hardware automatic fastening apparatus, which shares one device regardless of types to simultaneously transfer a plurality of parts when automatically fastening a bolt, a nut, or a clip, and automates a fastening process even in the upper and lower fastenings to prevent a fastening interference due to a difference in types and the transfer, thereby improving productivity of fastened products, uniformizing the quality thereof, and reducing labor costs.

Description of the Related Art

In an assembly line of a vehicle, a nut, a clip, etc. is put into and then fastened to a bolt on various parts to assemble the parts. The bolt, the nut, and the clip are mechanical elements widely used to couple two or more parts. Their fastening process is performed by matching both positions of the parts and then rotating the nut or the clip toward a bolt using a fastener. If necessary, processes to assemble the bolt and the nut in advance, or to assemble and then discharge them can be performed together.

When these processes are performed manually by an operator, defects can occur due to mistakes and labor costs are required, and it is not possible to increase productivity beyond a certain level. Therefore, it is preferable that in the assembly process of the bolt, the nut, and the clip, the fastening work of all devices can be performed in conjunction with a robot without an operator.

The foregoing explained as the background is intended merely to aid in the understanding of the background of the present disclosure, and is not intended to mean that the present disclosure falls within the purview of the related art that is already known to those skilled in the art.

SUMMARY

The present disclosure has been proposed to solve the above problem, and an object of the present disclosure is to provide a hardware automatic fastening apparatus, which shares one device regardless of type to simultaneously transfer a plurality of parts when automatically fastening a bolt, a nut, or a clip, and automates a fastening process even when fastening lower and upper portions of the relevant part to prevent a fastening interference due to a difference in types and the transfer, thereby improving productivity of fastened products, uniformizing the quality thereof, and reducing labor costs.

A hardware automatic fastening apparatus according to the present disclosure includes a magazine including a lever formed on an outer edge to store and supply hardware including any one or more types of a bolt, a nut, and a clip, a rotating part coupled to the magazine to rotate the magazine to position the hardware at a predetermined position, and a torque generating tool provided with an ascending and descending mechanism for ascending the hardware positioned by the rotating part upon ascending, and provided with a torque applying part for applying a torque to the ascended hardware, in which the lever has a latch structure.

The lever can include an inserting groove for accommodating the hardware so that the hardware is not separated to the outside, and can further include a tongs part formed to surround the inserting groove and protrude to the outside.

The tongs part can further include a protruding pin formed to protrude toward the inserting groove and guide the hardware so that the hardware is not separated to the outside.

The magazine can further include a rotation guide provided on an outer circumferential surface of the magazine to limit a change in the position of the hardware according to the rotation.

The magazine can further include a small slit having an opening portion positioned on a connection line connecting the inserting groove and a rotation center and a correct position detecting sensor coupled to the rotation guide to transmit and receive a sensor signal toward the rotation center.

The ascending and descending mechanism can include a first stage cylinder provided with a finger part formed with a plurality of protruding portions so that an upper end of the lever is fixed and released as it moves forward one step upward or moves backward one step downward.

The ascending and descending mechanism can further include a second stage cylinder provided with the torque applying part for applying the torque to the ascended hardware as it moves forward two steps upward.

The torque generating tool can further include a nut runner provided with a motor that allows the first stage cylinder to move forward one step upward or move backward one step downward, or the second stage cylinder to move forward two steps upward or move backward two steps downward.

The torque generating tool can further include an ascending and descending guide formed in a form of surrounding the outer circumferential surface of the ascending and descending mechanism to prevent vibrations due to the lifting or falling of the ascending and descending mechanism.

The lever can be rotated around a rotary shaft clockwise or counterclockwise, and can have a latch structure including a center pin positioned on the rotary shaft and allowing the lever to be fixed according to the rotation, and a spring forming a restoring force in a direction opposite to the rotating direction of the lever.

The rotating part can include a cylinder having an opening portion attachable to or detachable from the magazine to be coupled to or separated from the magazine, a servo motor for applying a rotating force to the magazine; and a belt connecting the servo motor to the magazine to deliver the rotating force to the magazine.

Another hardware automatic fastening apparatus according to the present disclosure includes a magazine including a lever formed on an outer edge to store and supply hardware including any one or more types of a bolt, a nut, and a clip, a rotating part coupled to the magazine to rotate the magazine to position the hardware at a predetermined position, and a torque generating tool provided with an ascending and descending mechanism for ascending the hardware positioned by the rotating part upon ascending, and provided with a torque applying part for applying a torque to the ascended hardware, in which the lever includes a magnet for accommodating magnetic hardware by a magnetic force so that the hardware is not distributed to the outside and has a latch structure.

The lever can further include a tongs part formed to surround the inserting groove and protruding to the outside.

The lever can be rotated around a rotary shaft clockwise or counterclockwise, and can have a latch structure including a center pin positioned on the rotary shaft and allowing the lever to be fixed according to the rotation, and a spring forming a restoring force in a direction opposite to the rotating direction of the lever.

The ascending and descending mechanism can include a first stage cylinder provided with a finger part formed with a plurality of protruding portions so that an upper end of the lever is fixed and released as it moves forward one step upward or moves backward one step downward.

The ascending and descending mechanism can further include a second stage cylinder provided with the torque applying part for applying the torque to the ascended hardware as it moves forward two steps upward.

According to the hardware automatic fastening apparatus, it is possible to share one device regardless of type to simultaneously transfer the plurality of parts when automatically fastening the bolt, the nut, or the clip, and to automate the fastening process even in the upper and lower fastenings to prevent the fastening interference due to a difference in types and the transfer, thereby improving productivity of fastened products, uniformizing the quality thereof, and reducing labor costs.

BRIEF DESCRIPTION OF THE FIGURES

The above and other objects, features and other advantages of the present disclosure will be more clearly understood from the following detailed description when taken in conjunction with the accompanying drawings, in which.

DETAILED DESCRIPTION

Specific structural or functional descriptions presented in exemplary embodiments of the present disclosure disclosed in the present specification or application are only exemplified for the purpose of describing the exemplary embodiments according to the present disclosure, and the exemplary embodiments according to the present disclosure can be carried out in various forms and should not be interpreted as being limited to the exemplary embodiments described in the present specification or application. Hereinafter, an exemplary embodiment of the present disclosure will be described in detail with reference to the accompanying drawings.

Here, hardware includes at least any one of a bolt, a nut, or a clip. The bolt is a fastener with a head having a fastening groove formed in an upper surface thereof, the nut is a fastener having a flange formed along an outer circumferential surface thereof on one side end thereof, and the clip is a fastener composed of a head portion and a fastening member formed to laterally protrude from a lower side of the head portion. The clips can be fastened to overlap each other.

Figure 1:
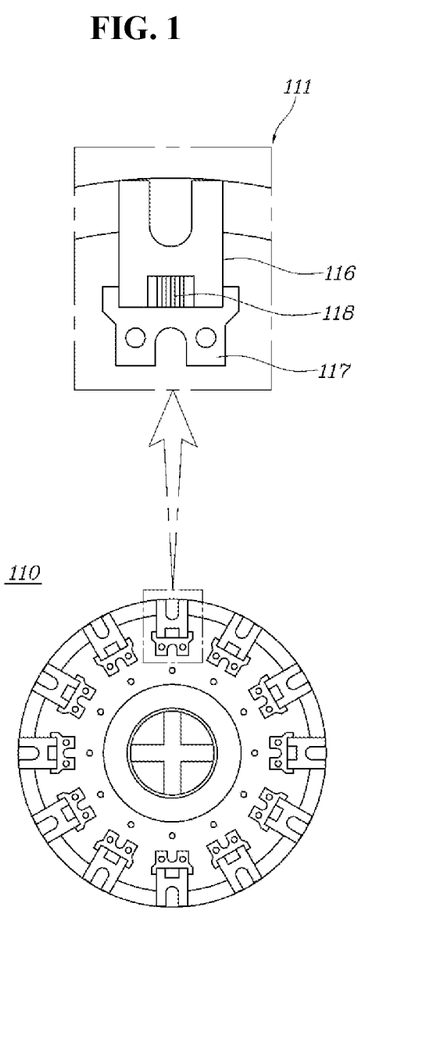
FIG. 1 is a diagram showing a magazine of a hardware automatic fastening apparatus according to an exemplary embodiment of the present disclosure.
Figure 2:
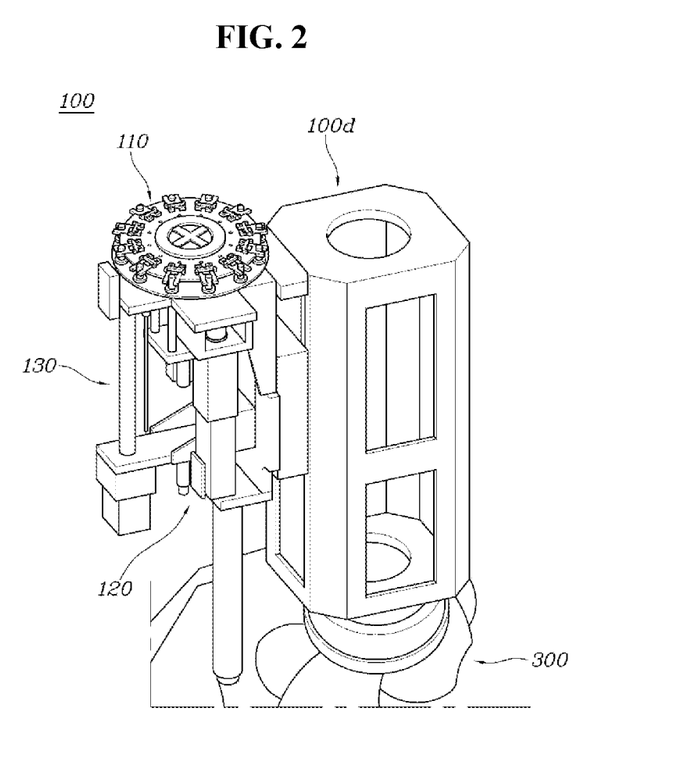
FIG. 2 is a diagram showing a part of the hardware automatic fastening apparatus according to an exemplary embodiment of the present disclosure.
Figure 3:
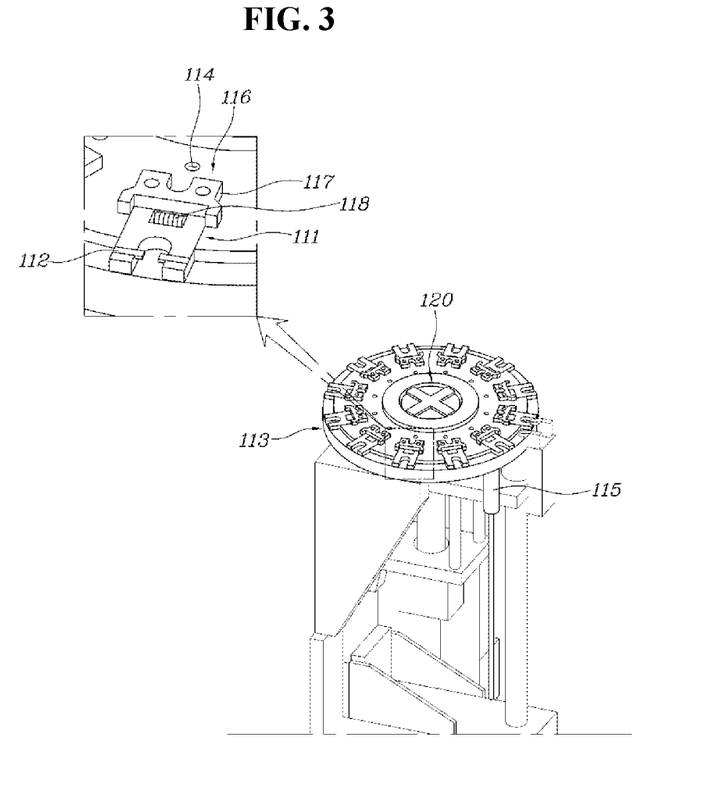
FIG. 3 is a diagram showing a latch structure on an outer circumferential surface of the hardware automatic fastening apparatus according to an exemplary embodiment of the present disclosure.
Figure 4:
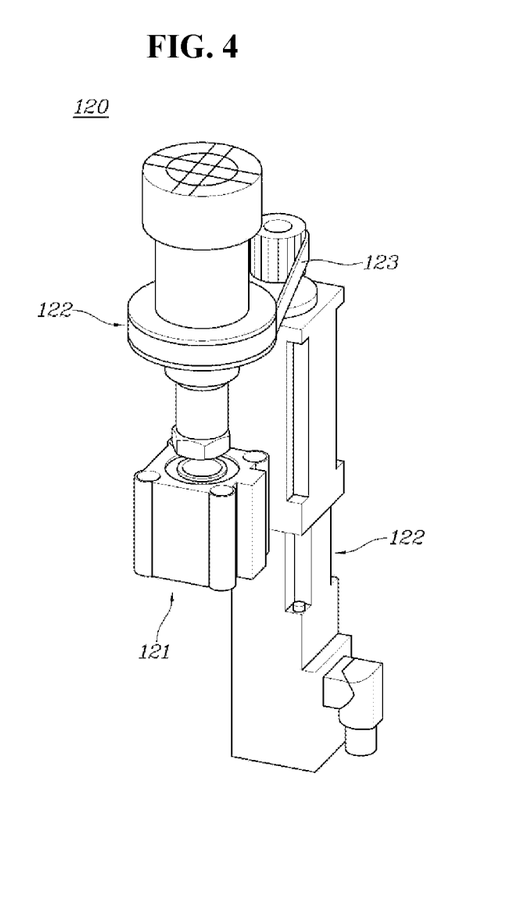
FIG. 4 is a diagram showing a rotation part of the hardware automatic fastening apparatus according to an exemplary embodiment of the present disclosure.
Figure 5:
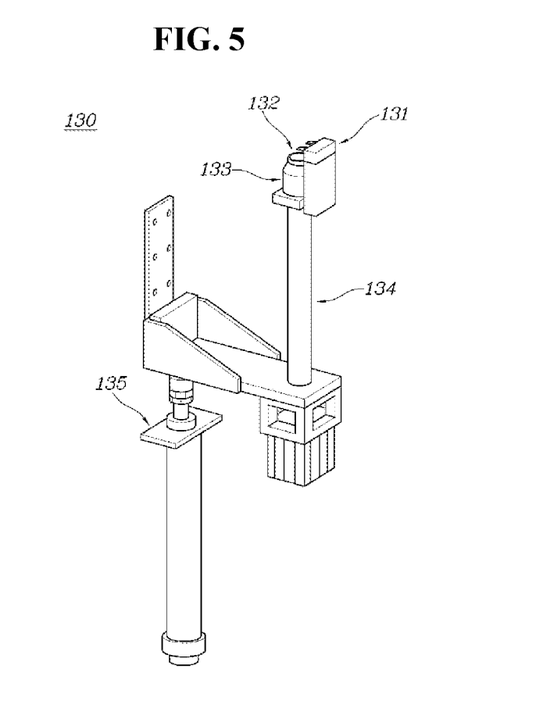
FIG. 5 is a diagram showing a torque generating tool of the hardware automatic fastening apparatus according to an exemplary embodiment of the present disclosure.
Figure 6:
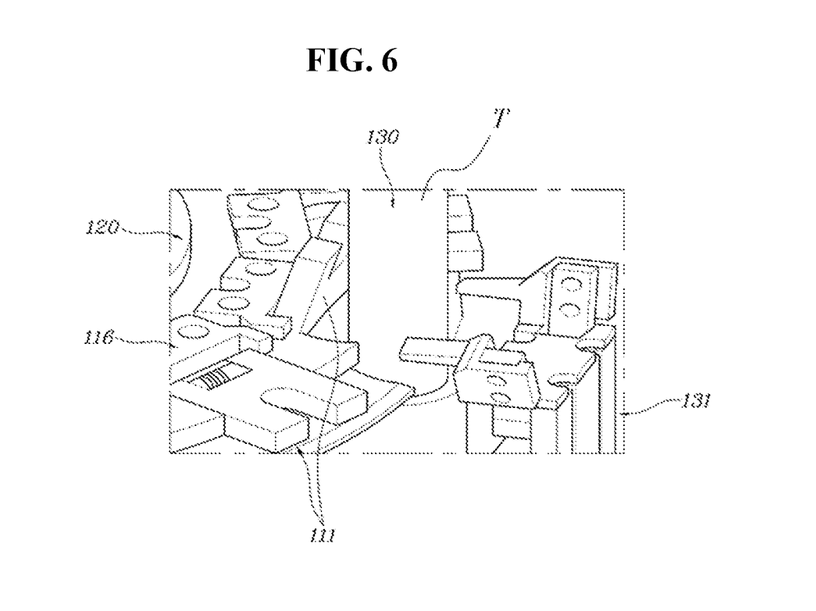
FIG. 6 is a diagram showing a fastening mechanism of the latch structure on the outer circumferential surface of the hardware automatic fastening apparatus according to an exemplary embodiment of the present disclosure.
Figure 7:
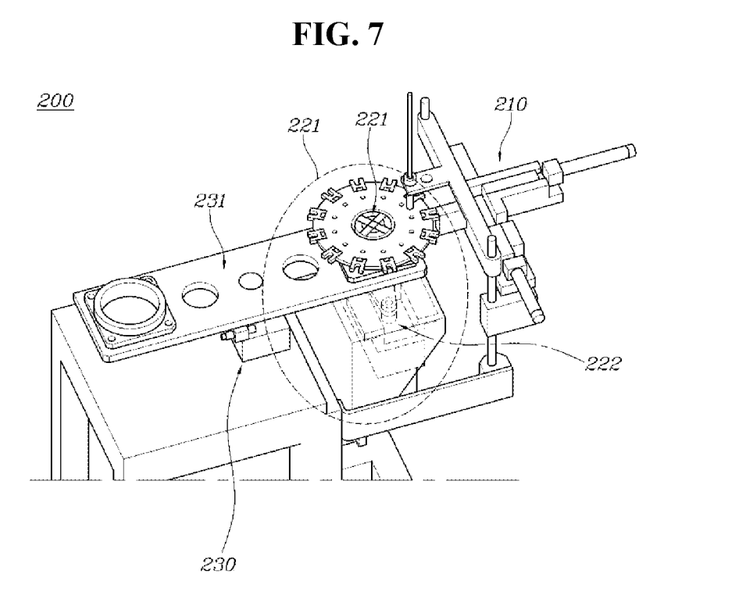
FIG. 7 is a diagram showing a supply part configured to supply hardware to the hardware automatic fastening apparatus according to an exemplary embodiment of the present disclosure.

FIG. 1 is a diagram showing a magazine of a hardware automatic fastening apparatus according to an exemplary embodiment of the present disclosure, FIG. 2 is a diagram showing a part of the hardware automatic fastening apparatus according to an exemplary embodiment of the present disclosure, FIG. 3 is a diagram showing a latch structure on an outer circumferential surface of the hardware automatic fastening apparatus according to an exemplary embodiment of the present disclosure, FIG. 4 is a diagram showing a rotation part of the hardware automatic fastening apparatus according to an exemplary embodiment of the present disclosure, FIG. 5 is a diagram showing a torque generating tool of the hardware automatic fastening apparatus according to an exemplary embodiment of the present disclosure, FIG. 6 is a diagram showing a fastening mechanism of the latch structure on the outer circumferential surface of the hardware automatic fastening apparatus according to an exemplary embodiment of the present disclosure, and FIG. 7 is a diagram showing a supply part configured to supply hardware to the hardware automatic fastening apparatus according to an exemplary embodiment of the present disclosure.

FIG. 1 is a diagram showing a hardware automatic fastening apparatus according to an exemplary embodiment of the present disclosure. As shown in FIG. 1, in the hardware automatic fastening apparatus according to the exemplary embodiment of the present disclosure, a magazine can be circular to be in the same position even when rotated. In addition, the magazine includes a lever 111 having an inserting groove formed on an outer edge to store and supply hardware in one direction. A plurality of levers can be formed to be spaced apart from each other along the outer circumferential surface of the magazine.

As shown in FIG. 1, the lever 111 is formed on the outer edge of the magazine. Therefore, the remaining portion of the lever 111 except for a latch structure 116 can include a tongs part having a plurality of protrusions surrounding the inserting groove. Here, the inserting groove is a unit for storing or supplying the hardware provided with a head portion such as a bolt and a clip.

Therefore, unlike the one shown in FIG. 1, as a unit for storing or supplying a nut, which is hardware without a head portion, the lever 111 does not have an inserting groove formed on the outer edge of the magazine, and the remaining portion of the lever 111 except for the latch structure 116 can be formed in a structure of fully covering an upper portion without the tongs part formed with the plurality of protrusions.

As shown in FIG. 1, the lever 111 is configured in the latch structure. Here, the latch structure (flip-flop) refers to a restoring structure of being pushed back in a direction perpendicular to a direction of a force and then returning. The lever having the latch structure has a restoring force of being pushed back in the direction perpendicular to the direction of the ascending force and then returning, or being pushed back in an opposite direction perpendicular to a direction of the descending force and then returning.

Here, if this force moves in a direction of ascending among the torque generating tool and a cylinder that is an ascending and descending mechanism with an opening portion formed therein is operated, the lever in the latch structure can be open in the direction perpendicular to the force while the hardware fixed to a specific location receives the ascending force and the hardware can be taken out in a specific space of the cylinder by a free fall. At the same time, the cylinder moves backward simultaneously as it rises by the restoring force. Therefore, the taken-out hardware is automatically fastened while overlapping each other or receiving a torque by a torque applying part T of the torque generating tool.

The latch structure of FIG. 1 includes a center pin 117 and a spring 118 provided in the lever 111. The center pin 117 fixes the lever 111 to form a central axis that tilts and returns so that the lever is open. The spring 118 provides a restoring force capable of returning even if the lever is opened in one direction by an elastic force. Therefore, the hardware can be taken out and fastened according to the above principle.

FIG. 2 is a diagram showing a part of the hardware automatic fastening apparatus according to the exemplary embodiment of the present disclosure. The hardware automatic fastening apparatus includes the lever 111 having the latch structure of FIG. 1, and includes the magazine 110 having the inserting groove formed on the outer edge thereof for storing and supplying the hardware, a rotating part 120 coupled to the magazine and for rotating the magazine to position the hardware at a predetermined position, and a torque generating tool 130 provided with an ascending and descending mechanism for lifting the hardware positioned by the rotating part upon lifting, and provided with a torque applying part T for applying a torque to the lifted hardware. Three types of the hardware automatic fastening apparatuses can be simultaneously provided for each clip, bolt, and nut included in the hardware. In addition, a bracket 100d for connecting three types of the automatic fastening apparatuses can be provided. In addition, a robot 300 for lifting and falling each fastening apparatus according to the fastening order of the hardware to be fastened can be provided.

FIG. 3 is a diagram showing a latch structure on the outer circumferential surface of the hardware automatic fastening apparatus according to the exemplary embodiment of the present disclosure. As described above with reference to FIG. 1, the lever 111 included in the magazine 110 can include the latch structure 116, and include the center pin 117 and the spring 118 to form the latch structure. In addition, the magazine 110 can be provided with protruding pins 112 on both ends of the lever 111, and the protruding pins 112 can be formed to protrude toward the inserting groove. As a result, the hardware is accurately fixed at a predetermined position through a physical force. Therefore, as shown in FIG. 3, the hardware automatic fastening apparatus according to the exemplary embodiment of the present disclosure further includes the protruding pin 112 together with the inserting groove, thereby enhancing a fixing force for positioning the hardware at a stable position.

Meanwhile, unlike the protruding pin 112 of FIG. 3, a magnet can be provided on the lever 111 for the hardware automatic fastening apparatus for fastening a magnetic bolt or nut. In other words, the position of the bolt or the nut can be fixed by the magnetic force of the magnet provided in the lever 111. The magnet provided in the lever 111 can be disposed in a place where the inserting groove is provided. In addition, the magnet provided in the lever 111 can be disposed at a position farther away from the position where the inserting groove is provided toward the rotation center, and disposed at both points in the lever symmetrical to the connection line connecting the inserting groove and the rotation center.

FIG. 3 is a diagram showing a latch structure on the outer circumference of the hardware automatic fastening apparatus according to the exemplary embodiment of the present disclosure, and the magazine 110 can be rotated, and can further include a rotation guide 113 outside the magazine to limit a change in the position of the hardware when rotated. The rotation guide can be a curved surface on the outer circumference in which the outer end of the lever 111 is rotated outward from the lever 111. The curved surface can prevent the hardware from being bounced off by bouncing the hardware again by an inertial force generated by the rotation.

FIG. 3 is a diagram showing a latch structure on the outer circumference of the hardware automatic fastening apparatus according to the exemplary embodiment of the present disclosure, and the magazine 110 can further include a small slit 114 having an opening portion positioned on a connection line connecting the inserting groove and the rotation center, and a correct position detecting sensor 115 coupled to the rotation guide 113 to transmit and receive a sensor signal toward the rotation center. As described above, the hardware can be distributed by the rotation. Therefore, the correct position detecting sensor 115 can be designed to detect whether the hardware is positioned on the correct position, which is the center of the inserting groove of the magazine 110. Therefore, the present disclosure can further include the small slit 114, and the correct position detecting sensor 115 can detect, as the rotation center, a point where the sensor signal of the correct position detecting sensor is detected on a first connection line connecting the inserting groove facing the small slit 114. In addition, the correct position detecting sensor 115 can detect whether the hardware is positioned on a second connection line connecting the small slit 114 around the rotation center to perform a control of the distribution of the hardware and the correct position according to the distribution.

FIG. 4 is a diagram showing the rotating part of the hardware automatic fastening apparatus according to the exemplary embodiment of the present disclosure, and the hardware automatic fastening apparatus according to the exemplary embodiment of the present disclosure can be provided with the cylinder 121 detachable from the magazine so that the rotating part 120 can be coupled with or separated from the magazine, a servo motor 122 for rotating the magazine, and a belt 123 connecting the servo motor to the magazine. In other words, the magazine 110 can be designed so that a plurality of hardware stacked on the magazine can be simultaneously moved by taking out or fastening the hardware through the ascending and descending of the torque generating tool 130 and then rotating it by the rotating part 120, and such a role is performed by the cylinder 121 and the servo motor 122 of the rotating part 120. Here, the cylinder 121 has an opening portion formed in a portion coupled to the servo motor so that it is coupled to the magazine to deliver the rotating force of the servo motor.

For the fitting and coupling with the cylinder 121, the magazine 110 includes a support part parallel to the magazine and formed in a certain thickness by setting any one point of a rotary shaft of the rotating part 120 as the center of mass, and to be coupled to the magazine 110, the cylinder 121 can be formed with a space spaced by a certain thickness so that the support part is fitted and can deliver the rotating force of the servo motor 122.

Of course, unlike the one shown in FIG. 4, the hardware automatic fastening apparatus according to another exemplary embodiment of the present disclosure can use a rotating body instead of the servo motor.

FIG. 5 is a diagram showing the torque generating tool of the hardware automatic fastening apparatus according to the exemplary embodiment of the present disclosure. The torque generating tool 130 of the hardware automatic fastening apparatus includes a first stage cylinder 131 provided with a finger part, which has a plurality of protruding portions formed thereon, so that an upper end of the lever 111 can be fixed or released as it moves forward one step upward or moves backward one step downward. The torque generating tool further includes a nut runner 135 provided with a motor that allows the first stage cylinder to move forward one step upward or moves backward one step downward, or a second stage cylinder to move forward two steps upward or move backward two steps downward. The torque generating tool also includes a fastening socket 132 having an opening portion that supports the hardware to be seated by fixing the upper end of the lever 111 not to be lifted by moving forward the first stage cylinder one step. The torque generating tool further includes an ascending and descending mechanism for lifting the lever 111 coupled to the lower side of the fastening socket 132 to store the hardware seated on the fastening socket 132 to take out the hardware from the magazine 111 and fall the lever to move to an original position, and an ascending and descending guide 133 formed in a form of surrounding an outer circumferential surface of the ascending and descending mechanism to prevent vibrations due to the lifting or falling of the ascending and descending mechanism. A second stage cylinder 134 is provided with the torque applying part T for applying the torque to the ascended hardware, and fastening the hardware by applying the torque to the hardware by the torque applying part T to pressurize the hardware while moving forward two steps upward.

In other words, according to the hardware automatic fastening apparatus according to the exemplary embodiment of the present disclosure, the upper end of the lever 111 is fixed or released by the nut runner 135 by moving forward or backward the first stage cylinder 131 one step, and at the same time, the ascending and descending mechanism takes out the hardware fixed to the magazine 110, and then the hardware is fastened by the second stage cylinder 134. Here, it is preferable that the height lifted when the first stage cylinder moves forward one step is set as the maximum height at which the lever 111 is not lifted. As a result, it is possible to increase stability thereof when seating the hardware positioned in the correct position on the torque generating tool 133.

However, here, the nut runner 135 is provided with a motor that allows the first stage cylinder to move forward one step upward or move backward one step downward, or the second stage cylinder to move forward two steps upward or move backward two steps downward, and unlike in FIG. 5, can be changed into different forms of rotating tools.

Meanwhile, the hardware automatic fastening apparatus according to the exemplary embodiment of the present disclosure is configured so that the hardware, which is seated on the center portion of the fastening socket by moving forward one step, freely falls as the opening portion of the fastening socket 132 also ascends through the lifting of the ascending and descending mechanism and the fixed upper end of the lever is released, thereby taking out the hardware in the torque generating tool 133.

However, this take-out principle is preferable when the hardware is provided with the protruding pin 112 shown in FIG. 3. In other words, the aforementioned take-out principle can be derived in a form in which the physical force does not act as the contact of the hardware weakly fixed by the physical force of the protruding pin 112 protruding toward the inserting groove is released by the lifting of the ascending and descending mechanism.

Therefore, unlike the protruding pin 112 shown in FIG. 3, according to the hardware automatic fastening apparatus according to another exemplary embodiment of the present disclosure to which the hardware is fixed by a magnet, the operation of the magnetic force cannot be released only by moving forward the first stage cylinder one step and ascending the ascending and descending mechanism. In addition, the hardware cannot be seated at the accurate position of the fastening socket 132 only by simply ascending the ascending and descending mechanism due to the angled structures (in particular, hexagonal structures) of the bolt and the nut among the hardware.

Therefore, according to the hardware automatic fastening apparatus according to another exemplary embodiment of the present disclosure, the nut runner can be designed to move forward or backward and can apply a torque to be seated on the fastening socket 132 while moving forward the first stage cylinder one step and ascending the ascending and descending mechanism. The rotating force of the torque generating tool 133 through the nut runner can be set at the maximum angular speed within a range higher than a pressurization frictional force due to the angled structure. In addition, even in this case, the lever 111 can be ascended by the set maximum at which the lever 111 is not lifted when the first stage cylinder 131 moves forward one step.

Of course, here, the nut runner 135 is provided with the motor that allows the first stage cylinder to move forward one step upward or move backward one step downward, or the second stage cylinder to move forward two steps upward or move backward two steps downward, as in the exemplary embodiment of the present disclosure, and unlike the one shown in FIG. 5, can be changed into different forms of rotating tools.

FIG. 6 is a diagram showing a fastening mechanism of the latch structure on the outer circumferential surface of the hardware automatic fastening apparatus according to an exemplary embodiment of the present disclosure. In particular, FIG. 6 shows the fastening mechanism according to the latch structure 116 of the lever 111 of the hardware automatic fastening apparatus according to the exemplary embodiment of the present disclosure. According to the hardware automatic fastening apparatus according to the exemplary embodiment of the present disclosure, a solution principle of taking out and fastening the hardware only by lifting or falling the ascending and descending mechanism of the torque generating tool 130 is the latch structure 116 of the lever of the magazine 111.

The order of taking out and fastening the hardware will be described with reference to FIG. 6 as follows. First, the position of the hardware is adjusted by fixing the upper end of the lever 111 by moving forward the first stage cylinder 131 one step. Next, the hardware is taken out by the hardware freely falling by the moving-backward-by-one-step of the first phase cylinder 131 and the lifting of the ascending and descending mechanism of the torque generating tool 130 or the rotating force applied simultaneously with the ascending force. At this time, as shown in FIG. 6, the lever 111 is opened in a vertical direction of an ascending force according to the latch structure. Then, the taken-out hardware is fastened by applying a torque to the hardware to pressurize the hardware by the torque applying part T provided on the second stage cylinder 134 while the torque applying part T moves forward two steps upward. (\After the hardware is taken out, the ascending and descending mechanism of the torque generating tool 130 descends, is opened in a direction opposite to the direction opened by the elastic force provided on the latch structure of the lever 111 due to the descending, and returns to the original position. The magazine 110 is then rotated by a preset angle with respect to the rotation center, and allows other hardware located in the plurality of other levers 111 spaced apart from each other to be located in the correct position. The steps are then repeated.

In other words, the hardware automatic fastening apparatus according to the exemplary embodiment of the present disclosure provides the unified fastening solution that fixes and releases the hardware and couples the taken-out hardware by the first stage cylinder 131 and the second stage cylinder 134 by enabling the latch structure of the lever to take out the hardware through the ascending and descending of the ascending and descending mechanism and to fall the ascending and descending mechanism.

FIG. 7 is a diagram showing a supply part configured to supply hardware to the hardware automatic fastening apparatus according to an exemplary embodiment of the present disclosure. The hardware can be supplied through a conveyor belt-type feeder part (not shown) such as a line feeder and/or a ball feeder and loaded on the supply part. A supply part 200 is a place for loading the fastened hardware, and includes an exchange part 230 for exchanging a new magazine on which the hardware is loaded in advance and an old magazine after fastening. The exchange part 230 includes a standby position 211 of the feeder part having an opening portion for recoupling the old magazine. A robot connected to the hardware automatic fastening apparatus 100 moves the hardware automatic fastening apparatus 100 to the standby position 211 of the feeder part.

Then, the robot detaches the cylinder 121 provided on the rotating part 120 from the fastening tool 100 to separate the old magazine 110 coupled to the cylinder, and seats the cylinder 121 on the standby position 211 of the feeder part having the opening portion for recoupling the new magazine 110. Thereafter, a seating plate 231 for supporting the standby position of the feeder part on the upper side can be designed to be rotatable by 180 degrees or more to exchange the new magazine on which the hardware is loaded in advance with the old magazine 110 after fastening. The exchange part 230 exchanges them by rotating the seating plate 231 by 180 degrees. Thereafter, when the exchange is completed, the robot 300 recouples the new magazine completely loaded back to the rotating part 120 using the cylinder 121.

Here, the robot coupled to the hardware automatic fastening apparatus according to the exemplary embodiment of the present disclosure is an automatic movement means, and can be replaced with an actuator to control a force.

The conventional automatic fastening apparatuses for the bolt and the nut are apparatuses for fixing the nut to the magazine and then fastening the bolt on the top, and convert the person's assembling using a driver into the automatic method. However, in this case, since the direction is fixed, it is not possible to fix the bolt to the magazine instead of the nut and separately fasten the nut to the bottom. In particular, since this shooting method transfers the nut or the bolt one by one, a high-speed transfer is impossible, and interference due to the bottom fastening is inevitable.

However, if the feeder part and the robot 300 are coupled to the hardware automatic fastening apparatus 100 according to the exemplary embodiment of the present disclosure, the loading operation of the new hardware and the fastening operation of the old hardware can be simultaneously performed. At the same time, the taking out and fastening according to the rotation of the magazine can lower the entire height of the robot, thereby avoiding the interference due to the hardware fastening.

While the specific exemplary embodiment of the present disclosure has been shown and described, it will be apparent to those skilled in the art that the present disclosure can be variously improved and changed without departing from the technical spirit of the present disclosure provided by the appended claims.

The invention claimed is:

1. A hardware automatic fastening apparatus comprising:
   a magazine comprising:
   a lever formed on an outer edge, the lever being configured to store and supply hardware consisting of a bolt, a nut, a clip, and/or combinations thereof;
   a rotating part coupled to the magazine configured to rotate the magazine to position the hardware at a predetermined position; and
   a torque generating tool including an ascending and descending mechanism for ascending the hardware positioned by the rotating part upon ascending, and including a torque applying part for applying a torque to the ascended hardware;
   wherein the lever has a latch structure.

2. The hardware automatic fastening apparatus of claim 1, wherein the lever further comprises an inserting groove for accommodating the hardware so that the hardware is not separated to the outside, and further comprises a tongs part formed to surround the inserting groove and protrude to the outside.

3. The hardware automatic fastening apparatus of claim 2, wherein the tongs part further comprises a protruding pin protruding toward the inserting groove and configured to guide the hardware so that the hardware is not separated to the outside.

4. The hardware automatic fastening apparatus of claim 1, wherein the magazine further comprises a rotation guide positioned on an outer circumferential surface of the magazine to limit a change in the position of the hardware according to a rotation of the magazine.

5. The hardware automatic fastening apparatus of claim 4, wherein the magazine further comprises:
   a slit having an opening portion positioned on a connection line connecting the inserting groove and a rotation center; and
   a correct position detecting sensor coupled to the rotation guide to transmit and receive a sensor signal toward the rotation center.

6. The hardware automatic fastening apparatus of claim 1, wherein the ascending and descending mechanism comprises a first stage cylinder having a finger part formed with a plurality of protruding portions so that an upper end of the lever is fixed and released as the lever moves forward one step upward or moves backward one step downward.

7. The hardware automatic fastening apparatus of claim 6, wherein the ascending and descending mechanism further comprises a second stage cylinder including the torque applying part for applying the torque to the ascended hardware as the ascended hardware moves forward two steps upward.

8. The hardware automatic fastening apparatus of claim 7, wherein the torque generating tool further comprises a nut runner provided with a motor that allows the first stage cylinder to move forward one step upward or move backward one step downward, or the second stage cylinder to move forward two steps upward or move backward two steps downward.

9. The hardware automatic fastening apparatus of claim 6, wherein the torque generating tool further comprises an ascending and descending guide surrounding the outer circumferential surface of the ascending and descending mechanism, and configured to prevent vibrations due to the lifting or falling of the ascending and descending mechanism.

10. The hardware automatic fastening apparatus of claim 6, wherein the lever is rotated around a rotary shaft clockwise or counterclockwise, and has a latch structure comprising a center pin positioned on the rotary shaft and allowing the lever to be fixed according to the rotation, and a spring forming a restoring force in a direction opposite to the rotating direction of the lever.

11. The hardware automatic fastening apparatus of claim 1, wherein the rotating part comprises a cylinder having an opening portion attachable to or detachable from the magazine to be coupled to or separated from the magazine, a servo motor for applying a rotating force to the magazine, and a belt connecting the servo motor to the magazine to deliver the rotating force to the magazine.

12. A hardware automatic fastening apparatus comprising:
a magazine comprising:
 a lever formed on an outer edge to store and supply hardware consisting of a bolt, a nut, a clip, and/or combinations thereof;
 a rotating part coupled to the magazine to rotate the magazine to position the hardware at a predetermined position; and
 a torque generating tool including an ascending and descending mechanism for ascending the hardware positioned by the rotating part upon ascending, and including a torque applying part for applying a torque to the ascended hardware;
 wherein the lever comprises a magnet for accommodating magnetic hardware by a magnetic force so that the hardware is not distributed to the outside, and the lever has a latch structure.

13. The hardware automatic fastening apparatus of claim 12, wherein the lever is rotated around a rotary shaft clockwise or counterclockwise, and the latch structure comprises a center pin positioned on the rotary shaft and allowing the lever to be fixed according to the rotation, and a spring forming a restoring force in a direction opposite to the rotating direction of the lever.

14. The hardware automatic fastening apparatus of claim 12, wherein the ascending and descending mechanism comprises a first stage cylinder having a finger part formed with a plurality of protruding portions so that an upper end of the lever is fixed and released as the lever moves forward one step upward or moves backward one step downward.

15. The hardware automatic fastening apparatus of claim 14, wherein the ascending and descending mechanism further comprises a second stage cylinder including the torque applying part for applying the torque to the ascended hardware as the ascended hardware moves forward two steps upward.

* * * * *